Figure 1:
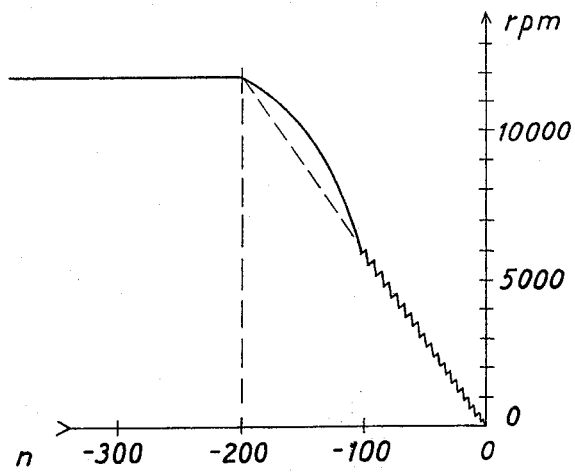

United States Patent [19]  [11] 3,906,318
Kjellberg et al.  [45] Sept. 16, 1975

[54] DEVICE FOR PROVIDING A CONTROLLED RETARDATION OF A WINDING MACHINE

[75] Inventors: Leif Roland Kjellberg, Stockholm; Kjell Riise, Huddinge; Per-Olov Svensson, Ekero, all of Sweden

[73] Assignee: Telefonaktiebolaget LM Ericsson, Stockholm, Sweden

[22] Filed: Feb. 11, 1974

[21] Appl. No.: 441,639

[30] Foreign Application Priority Data
Feb. 26, 1973 Sweden............................ 7302676

[52] U.S. Cl.................................. 318/269; 187/29
[51] Int. Cl.².......................................... G05B 19/30
[58] Field of Search ....... 318/269, 601, 603; 187/29

[56] References Cited
UNITED STATES PATENTS
3,589,474  6/1971  Wavre................................. 187/29
3,590,355  6/1971  Davis et al..................... 318/603 X
3,777,855  12/1973  Boyldew et al. ..................... 187/29

Primary Examiner—Robert K. Schaefer
Assistant Examiner—W. E. Duncanson, Jr.
Attorney, Agent, or Firm—Hane, Baxley & Spiecens

[57] ABSTRACT

The invention relates to a device for providing a controlled retardation of a winding machine whose winding axis is arranged to be driven by a motor and retarded by a brake, comprising a sensor element that is arranged to generate pulses in dependence on the rotation of the winding axis, a first counter circuit that is connected to the sensor element and is arranged to be stepped by pulses from a starting value, that corresponds to a desired number of winding turns, to a stop value, and a second counter circuit that is connected to the sensor element and is arranged to measure the number of pulses per time unit from the latter in order to determine the actual value of the rotatory speed of the winding axis for controlling the operation of the motor and the brake.

4 Claims, 2 Drawing Figures

DEVICE FOR PROVIDING A CONTROLLED RETARDATION OF A WINDING MACHINE

The invention relates to a device for providing a controlled retardation of a winding machine having a winding axis which is arranged to be driven by a motor and retarded by a brake, comprising a sensor element that is arranged to generate pulses in dependence on the rotation of the winding axis, a first counter circuit that is connected to the sensor element and is arranged to be stepped by such pulses from a starting value, that corresponds to a desired number of winding turns, to a stop value, and a second counter circuit that is connected to the sensor element and is arranged to measure the number of pulses per time unit from the latter in order to determine the actual value of the rotatory speed of the winding axis for controlling the operation of the motor and the brake.

Coil winding machines are known in which a starting value, that is equal to a desired number of winding turns is read into a subtracting counter that counts towards zero during the progress of the winding, a routine of retardation being manually initiated and controlled when a given number of turns remain before the stop. Since these winding machines now use a very high winding speed in order to reduce the winding time there is a need of an automatically controlled retardation routine so that this will neither be unnecessarily long nor hazardously short in which latter case overwinding can occur, the result usually being that the coils must be rejected.

The device according to the invention satisfies such need and is characterized as it appears from the following claims.

Figure 2:
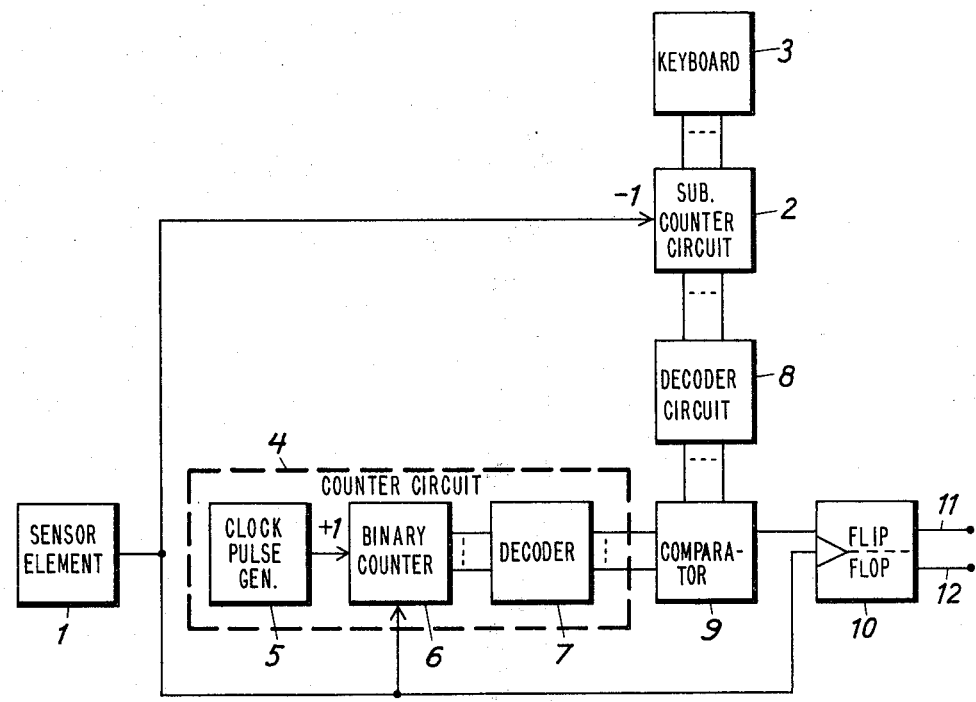

The invention will now be described more in detail with reference to the accompanying drawing, where:

FIG. 1 shows a diagram over a course of retardation of a winding machine controlled by the device according to the invention; and FIG. 2 shows a block diagram of an embodiment of the latter.

FIG. 1 shows a diagram of a course of retardation for a winding axis of a coil winding machine controlled by the device according to the invention. The number of winding turns n that remain before the stop is indicated along an horizontal axis and the rotatory speed of the winding axis that is measured in revolutions per minute, rpm, is indicated along a vertical axis. The rotatory speed is, during the major part of the course of winding, constant and according to the example equal to 12,000 rpm. A strong retardation is initiated when 200 winding turns n remain before the stop and the rotatory speed decreases quickly from 12,000 rpm to 6,000 rpm where, according to the example, 100 winding turns n remain. Thereafter, the winding axis is alternatively driven and retarded in such a way that the rotatory speed in rpm decreases linearly with the number of winding turns n that remain before stop.

The routine of retardation shown in FIG. 1 is neither unnecessarily extended nor hazardously short thanks to the accurate control that is provided by the device according to the invention. A corresponding routine of retardation that is manually controlled cannot be carried out as accurately and must therefore be more extended in time in order to avoid the overwinding that would result in coil rejections.

FIG. 2 shows a block diagram of an embodiment of the device of the invention for providing in accordance with FIG. 1 a retardation routine of a not shown coil winding machine whose winding axis is arranged to be driven by an electric motor and retarded by a magnetic brake. The device comprises a sensor element 1 arranged to generate pulses in dependence on the rotation of the winding axis, a subtracting counter circuit 2 that is connected to the sensor element 1 and is arranged to be stepped backward to zero by the pulses of the sensor element 1 starting out from a starting value that is read into it via a keyboard 3 and that is equal to a desired number of winding turns, and a second counter circuit 4 that is connected to the sensor element 1 and is arranged to measure the number of pulses per time unit from the latter in order to determine the actual value of the rotatory speed of the winding axis.

The counter circuit 4 consists of a clock pulse generator 5 generating clock pulses that have a rate of repetition which according to the example is equal to 10 times the rate of repetition of the pulses from the sensor element 1 at maximum rotatory speed of the winding axis, a binary counter 6 which has a forward stepping input connected to the clock pulse generator 5 in order to be stepped forward by the clock pulses from the latter and a reset input connected to the sensor element 1 in order to be reset each time this generates a pulse, and a decoder 7 that is connected to the binary counter 6 in order to produce said actual value of the rotatory speed of the winding axis.

A decoder circuit 8 is connected to the counter circuit 2 to produce a desired value for the rotatory speed of the winding axis in dependence on how many steps the counter circuit 2 has left before zero, corresponding to the number of remaining winding turns. The desired value is chosen equal to the maximum rotatory speed of the winding axis until 200 winding turns remain whereupon the desired value decreases linearly with the number of remaining winding turns.

By means of a digital comparator circuit 9 connected to the decoder circuit 7 and the decoder circuit 8 the actual and desired values of the rotatory speed are compared. The comparison result is applied to a flip-flop 10 and where it is registered during the leading edge of the pulses from the sensor element 1. It is hereby assumed that the stepping forward and the resetting respectively of the counters 2 and 6 are carried out with a certain delay relative to the registering in the flip-flop 10. This can be made certain if the pulses of the sensor element 1 are applied to the counters 2 and 6 via a not shown delay circuit.

If the actual value of the rotatory speed is less than the desired value, an output 11 of the flip-flop 10 assumes a binary "1" and activates the electric motor for driving the winding axis while, in the opposite case, an output 12 of the flip-flop 10 assumes instead a binary "0" and activates the magnetic brake. The activation of the electric motor and the magnetic brake is suitably carried out by means of optical couplers and thyristor switches in known manner.

The comparator circuit 9 and the counter circuit 4 are not limited to work digitally but can also work in the analog way implying, however, that a digital-to-analog converter must be inserted between the decoder circuit 8 and the comparator circuit 9.

We claim:

1. In a winding apparatus having a shaft which is driven by a motor and retarded by a brake, apparatus for controlling the retardation of the rotation of the shaft which is brought to a stop after a predetermined number of winding turns, said apparatus comprising sensor means for generating pulses in dependence on the rotation of the shaft, a first pulse counter means presettable to a desired count number related to the desired number of winding turns and connected to said sensor means for decrementing the preset count number in response to pulses received from said sensor means, first decoder means connected to said first pulse counter means for converting the instantaneous count member in said first counter means to a first digital number representing a desired shaft rotation velocity for the instantaneous count number in accordance with a function which generally decreases linearly from a given count number to stop count number, digital velocity representing means connected to said sensor for generating a second digital number representing the actual instantaneous shaft rotation velocity, a digit comparator means for comparing said first and second digital numbers, and a relaying means connected to said digital comparator means for activating the motor only if the second digital number representing the actual shaft rotation velocity is less than the first digital number representing the then desired shaft rotation velocity and for activating the brake only if said second digital number is greater than said first digital number.

2. The apparatus of claim 1 wherein said digital velocity representing means comprises a clock pulse generator for generating clock pulses having a repetition rate at least as large as the rate of repetition of the pulses from said sensor means at maximum rotatory velocity of the shaft, a second pulse counter means having an incrementing input connected to said clock pulse generator for accumulating a count of the clock pulses and a reset input connected to said sensor means for clearing the accumulated count in response to pulses therefrom, and a second decoder means connected to said second pulse counter means for generating said second digital number.

3. The apparatus of claim 2 wherein said relaying means is connected to said sensor means and to said digital comparator means whereby the output of said digital comparator means is sampled under the control of pulses from said sensor means.

4. The apparatus of claim 3 wherein said relaying means includes a flip-flop whose state is controlled by the output of said digital comparator means for sending activating signals to the brake or the motor.

* * * * *